W. C. BANKS.
Cotton-Planter.
No. 67,481. Patented Aug. 6. 1867.
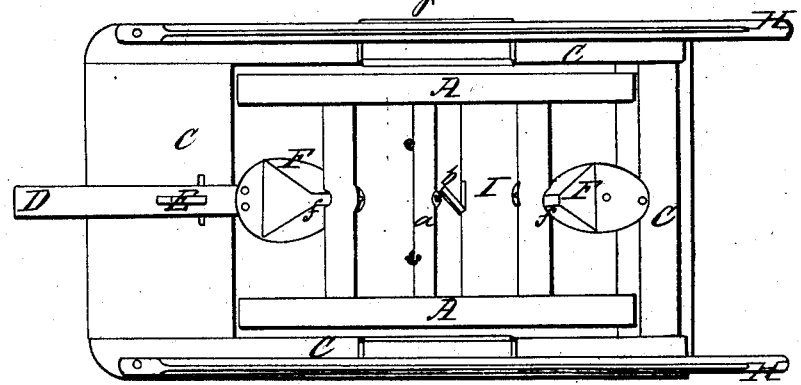
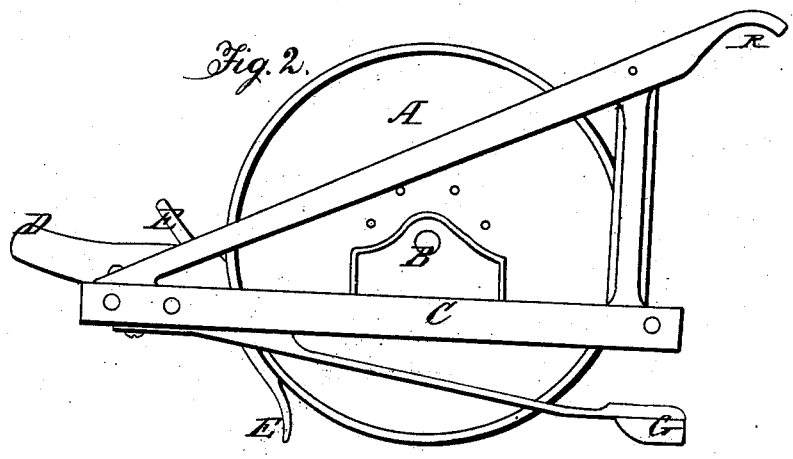
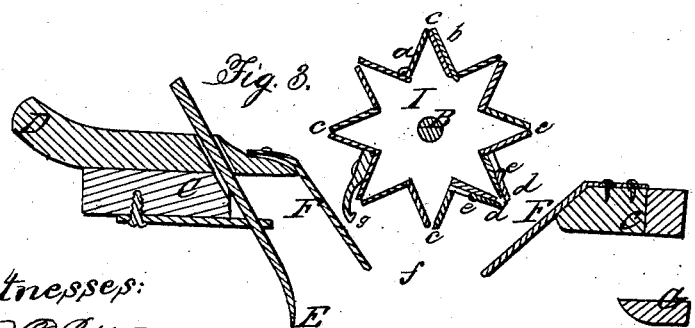

United States Patent Office.

WILLIAM C. BANKS, OF COMO DEPOT, MISSISSIPPI.

Letters Patent No. 67,481, dated August 6, 1867.

COTTON-SEED PLANTER.

*The Schedule referred to in these Letters Patent and making part of the same.*

TO ALL WHOM IT MAY CONCERN:

Be it known that I, WILLIAM C. BANKS, of Como Depot, in the county of Panola, and State of Mississippi, have invented certain new and useful Improvements in Machines for Planting Cotton-Seed; and I do hereby declare the following to be a full, clear, and exact description of the same, reference being had to the accompanying drawings, making a part of this specification, in which—

Figure 1 represents a top plan of the machine.

Figure 2 represents a side elevation; and

Figure 3 represents a vertical longitudinal section through the working parts of the machine.

Similar letters of reference, where they occur in the separate figures, denote like parts of the machine in all the drawings.

Cotton-seed, from the quantity of fibre adhering to it, is very difficult to sow or plant by a machine with anything like regularity.

My invention consists mainly in the devices for regulating the quantity of seed delivered from the seed-box, their collection in a hopper-shaped bottomless receptacle, and their forced removal from said receptacle, so that they shall fall with regularity, and in a straight row or furrow, or as nearly so as practicable.

To enable others skilled in the art to make and use my invention, I will proceed to describe the same with reference to the drawings.

A A represent a pair of supporting-wheels, to the journals B of which is hung a frame, C, to which is united a tongue, D, a furrow-opener, E, a guiding-box or hopper, F, a leveller or coverer, G, and handles H H. The wheels A A are so placed as to straddle the furrow that is to be planted, and connected to and revolving with the wheels is a seed-box, I, which in its cross-section is of a star-shaped form, as shown in fig. 3. One of the ribs $a$ of the seed-box may be hinged so as to swing open like a door, for the charging of the box with the seeds that are to be planted; and when charged the piece $a$ is swung shut and fastened by a button, $b$, or otherwise. At about the centre of the box I in its length, and at the points or angles of its meeting ribs, there are holes $c\ c\ c$, &c., for the seed to drop through as they in succession turn around and downward, the turning of the seed-box preventing the seeds from packing or clogging therein; and to regulate and adjust these holes $c$ as to size, slotted plates $d\ d$, controlled by set-screws $e\ e$, are arranged so as to be moved towards or from each other and over said openings, and thus give them the capacity required to pass the seeds through in regulated quantities. Underneath the seed-box I there is a receiving and directing-box or hopper, F, the sides of which all slope towards a narrow long opening, $f$, in its bottom, so as to bring all the seed dropping into it to this opening; and on the seed-box I there is one or more fingers $g$, which, as the seed-box revolves, forces the seeds out of the receiver, and leaves them to drop in the furrow prepared by the furrow-opener E and which seeds are covered up and the earth smoothed over them by the coverer G. The furrow-opener is made adjustable so as to open a shallower or deeper furrow, as may be required, and the machine is guided along the furrow by the operator holding the handles H, and following behind the machine, which is drawn over the ground by a horse or horses.

Having thus fully described my invention, what I claim therein as new, and desire to secure by Letters Patent, is—

The seed-box I, having the form herein described, and provided with openings $c\ c$, in combination with the finger $g$ and guiding-box or hopper F, when arranged and operating in the manner and for the purpose specified.

WM. C. BANKS.

Witnesses:
R. W. TERRY,
W. E. TERRY.